United States Patent [19]
Yang

[11] Patent Number: 5,408,166
[45] Date of Patent: Apr. 18, 1995

[54] DYNAMIC CURRENT FEEDBACK MAGNETIZING TYPE SERIES OR COMPOUND DC MOTOR-GENERATOR CONTROL CIRCUIT

[76] Inventor: Tai-Her Yang, 5-1 Taipin St., Si-Hu Town, Dzan-Hwa, Taiwan, Prov. of China

[21] Appl. No.: 102,612

[22] Filed: Jul. 8, 1993

[51] Int. Cl.$^6$ .............................................. H02P 7/18
[52] U.S. Cl. .................... 318/530; 318/523; 318/245
[58] Field of Search ............... 318/140, 141, 144, 145, 318/146, 148, 150, 151, 152, 153, 154, 244, 245, 246, 251, 430, 431, 521, 523, 526, 527, 529, 530, 532, 533

[56] References Cited

U.S. PATENT DOCUMENTS 2,411,377  11/1946  Kimball .
2,462,171  2/1949   Erbe et al. .
2,686,288  8/1954   Pestarini .
3,242,407  3/1966   Hansen .

*Primary Examiner*—Bentsu Ro
*Attorney, Agent, or Firm*—Bacon & Thomas

[57] ABSTRACT

Dynamic current feedback for a main motor-generator is provided by an auxiliary generator which supplies power directly to the main excitation field winding of the main motor-generator, rather than to an auxiliary shunt field winding as in a prior design, the main auxiliary generator in turn being driven by a current-follower type DC motor whose speed depends on the amount of current passing through the main motor-generator armature or the voltage drop across the main motor-generator series winding in the case of a series or compound main motor-generator. The current supplied by the auxiliary generator to the main excitation field winding of the main motor-generator can have either the same polarity as the main excitation field winding of the main motor-generator, or an inverse polarity, to provide positive or negative feedback.

21 Claims, 2 Drawing Sheets

DYNAMIC CURRENT FEEDBACK MAGNETIZING TYPE SERIES OR COMPOUND DC MOTOR-GENERATOR CONTROL CIRCUIT

BACKGROUND Of THE INVENTION

The present invention is an improvement on a prior control arrangement for a series or compound motor-generator in which the motor-generator has an auxiliary shunt field winding, including a feedback unit made up of at least one current-follower type DC motor that runs at high or low speed, subject to the amount of current passing through the main motor-generator armature, and an auxiliary generator, the electric energy generated by the auxiliary generator being provided to the auxiliary shunt field winding of the main motor-generator to control its output, either by assisted excitation in which the shunt field has the same polarity as the series field so that the combined field of the main motor-generator is strengthened when the main motor-generator armature current increases, or by differential excitation in which the field has a different polarity than the series field so that the combined field is reduced in response to an increase in the main motor-generator armature current.

Such a control arrangement was disclosed in U.S. patent application Ser. No. 08/032,136, filed on Mar. 17, 1993.

SUMMARY OF THE INVENTION

The present invention relates to an improvement on the prior arrangement in which the shunt or series winding of the motor-generator is further employed as an auxiliary excitation winding to replace the separate auxiliary shunt-field winding in the prior application.

The purpose of this improvement is lower production costs and reduce the load on the winding inside the motor-generator chamber so as to increase its efficiency. Control of the feedback is provided by a control interface which controls the output voltage or output impedance from the auxiliary generator and which further selects either assisted or differential excitation, as described above, of the main motor-generator auxiliary field winding. The present dynamic current feedback unit for a series or compound DC motor-generator control circuit is also applicable to a separate generator or dynamo motor, and may replace expensive magnetic saturation amplifiers or other complicated switch loops to provide an independent, durable and reliable dynamo control system.

DETAILED DESCRIPTION OF THE PREFERRED EMBODIMENTS

A conventional DC motor-generator set includes dynamo motors and generators, the dynamo motors having speed control and torsion feedback compensation responsive to load increases, while the generators are arranged such that a change in driving speed results in voltage change or positive/negative feedback of input current against the output voltage.

The present dynamic current feedback magnetizing type series or compound D.C motor-generator control circuit is a new design for a control system for the aforesaid DC motor-generator set, which uses a cheaper but nevertheless reliable low power auxiliary motor and generator assembly for controlling the main motor-generator set with greater horsepower. The principal advantages of the preferred dynamic current feedback magnetizing type series or compound DC motor-generator control circuit are its good performance, high reliability and lower production costs in comparison with conventional control systems.

The basic principle of operation of the present dynamic current feedback magnetizing type series or compound DC motor-generator control circuit is to derive the feedback power from the same external power source that is used for running the main motor-generator set, which may for example be a mechanical rotary power source such as an engine, a water wheel, or a dynamo motor, when the main motor-generator is a generator set. The feedback unit for the main motor-generator includes a generator and a series or compound dynamo motor, the dynamo motor making use of the main motor-generator winding and related main motor-generator armature (the dynamo armature being parallel connected to the shunt winding of the main motor-generator armature when the motor is a compound type motor), and related mechanical structures such as the main motor-generator end casing, spindle bearings, etc. When the main motor-generator is a motor, it accepts an electric power input from the feedback unit and provides an electric energy output thereto, and when the main motor-generator set is a generator, it accepts a mechanical power input from the feedback unit and provides an electric energy output thereto.

Figure 1:
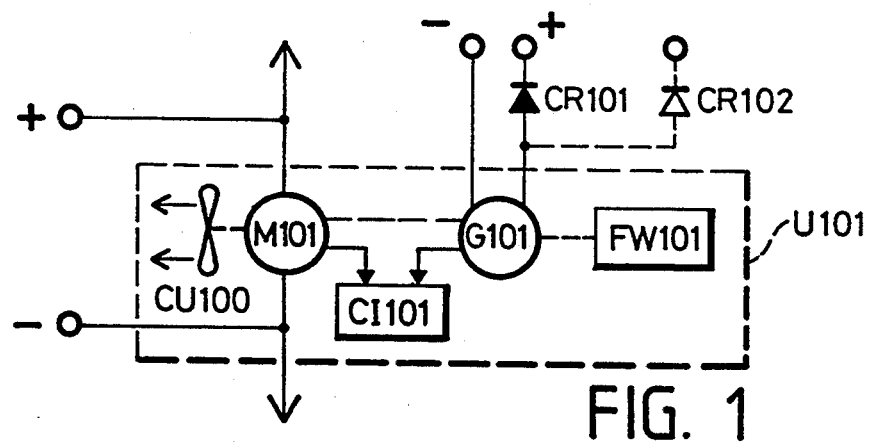
FIG. 1 is a schematic diagram showing the major elements of a feedback unit for use in the dynamic current feedback magnetizing type shunt or series or compound DC motor-generator control circuit of a preferred embodiment of the invention.

Referring to FIG. 1, the feedback unit of the preferred motor-generator control circuit includes a follower motor M101, which may be a series or shunt motor, or a permanent-magnet type or compound motor, its following electric energy coming from (1) a series connection with the series winding and armature or a parallel connection to the series winding or armature of the main motor-generator, if the follower motor is a series motor, or (2) a parallel connection between its armature and the series winding of the main motor-generator armature and a series connection with the armature thereof, or a series connection with the series winding and a parallel connection to the armature of the main motor-generator, if the follower motor is a shunt or permanent-magnet motor, or (3) a series connection between its armature and series winding series and the armature and series winding of the main motor-generator, or a parallel connection to the series winding or armature of the main motor-generator, if the follower motor is a compound motor.

The preferred control circuit also includes an auxiliary generator G101 driven by the aforesaid follower type motor M101 and having a generating capacity which depends on the running speed of the follower type motor for exciting the series or shunt field winding of the main motor, the relationship between the generating capacity and running speed of the main motor-generator being either a direct or inverse ratio subject to the wiring relationship between the follower motor and the main motor-generator. Those skilled in the art will appreciate that generator G101 can be either a DC generator or an AC generator and rectifier.

The preferred control circuit further includes a control interface CI101 for controlling the output voltage or current value of the auxiliary generator G101, the control interface including an adjustable impedance connected in series with the output of the feedback circuit to the main motor-generator armature (or shunt field winding if available), or to a linear or switching (pulse) type modulator connected in series with the output to the armature (or field winding if available), the control interface having another end connected to a manual or electro-control signal input/output. Excitation of the auxiliary generator G101 against the series or shunt field winding of the main motor-generator may be a direct excitation or be through a series connected choking diode CR101 (or CR102) to prevent counter flow.

Figure 2:
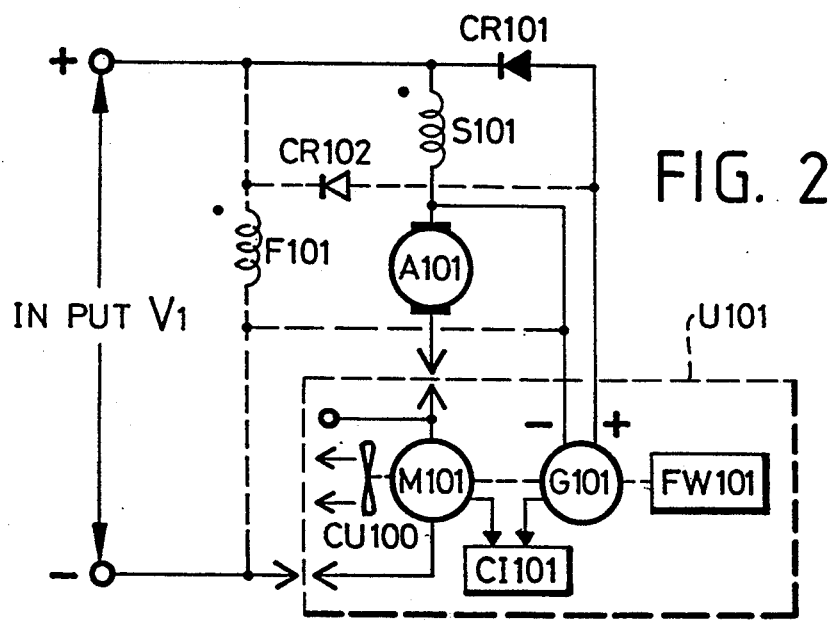
FIG. 2 is a schematic diagram showing an embodiment of the preferred dynamic current feedback magnetizing type shunt or series or compound DC motor-generator control circuit in which a current-follower motor of the feedback unit is connected in series with the main motor-generator armature and which thus uses the armature load current as the current for driving the current-follower motor.

The feedback unit of this embodiment may be used in a circuit of the type shown in FIG. 2, which shows an embodiment in which the current-follower motor M101 of the feedback unit is connected in series with the motor-generator armature using the armature load current as the current for driving the motor.

The main motor-generator set shown in FIG. 2 may be a series motor, including series field winding S101 and armature A101, or it may be a compound motor further including a shunt field winding F101, the series or shunt winding accepting feedback unit U101 control by virtue of the choking diode CR101 (or CR102). Follower motor M101 of feedback unit U101 is connected in series with the armature A101 of the main motor-generator. If excessive current occurs on the armature of the main motor-generator, the follower motor can be parallel connected to the shunt field winding F101 and then jointly in series with the armature of the main motor-generator.

Auxiliary generator G101 is driven by the aforesaid follower motor M101 such that the generating capacity depends on the running speed to excite the series or shunt field winding of the main motor via the choking diode CR101 (or CR102), the relationship between the generating capacity of generator G101 and the running speed of the main motor-generator being either a direct ratio or an inverse ratio subject to the wiring relationship between the follower motor and the main motor-generator. The generator may be either a DC generator or an AC generator and rectifier.

In this embodiment, control interface CI101 is again provided for controlling the output voltage or current value of the auxiliary generator, and may include an adjustable impedance connected in series with the feedback output to the main motor-generator armature (or field winding if available), or a linear or switching type modulator connected in series with the output of the armature (or field winding if available), the control interface having another end connected to a manual or electro-control signal input/output. Again, excitation by the auxiliary generator G101 of the series or shunt field winding of the main motor-generator may be a direct excitation or be through a series connected choking diode CR101 (or CR102) to prevent counter flow.

Figure 3:
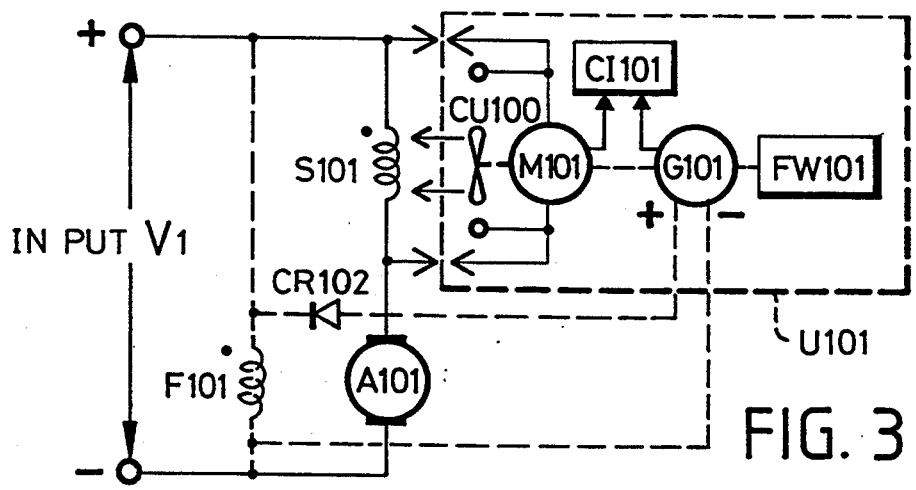
FIG. 3 is a schematic diagram showing an embodiment of the preferred dynamic current feedback magnetizing type shunt or series or compound DC motor-generator control circuit in which the current-follower motor of the feedback unit is connected in parallel with the series winding of the main motor-generator and the feedback unit uses the resulting voltage drop as the source of electric energy for driving the current-follower motor.

FIG. 3 is a diagram showing an embodiment of the preferred control circuit in which the current-follower motor M101 of the feedback unit is connected in parallel with the series winding of the main motor and the voltage drop across the series winding is used as the source of electric energy for driving the follower motor.

In this embodiment, the main motor-generator set is a series motor which includes series field winding S101 and armature A101, or a compound motor further including shunt winding F101, the series or shunt field winding accepting feedback unit U101 control by virtue of the choking diode CR102.

Follower motor M101 of feedback unit U101 is connected in parallel to the series winding S101 of the main motor-generator, such that when the main motor-generator passes a greater current by the series winding, a larger voltage drop ES is formed on each side of the series winding to increase the end voltage and running speed of follower motor M101 that is parallel connected to the series winding.

Auxiliary generator G101 is driven by follower motor M101 such that the generating capacity depends on the running speed to excite the series or shunt winding of the main motor via choking diode CR102, the relationship between the generating capacity of generator G101 and the running speed of the main motor-generator being either a direct ratio of an inverse ratio subject to the wiring relationship between the follower motor and the main motor-generator. Again, the generator may include either a DC motor or an AC generator and rectifier, while control interface CI101 controls the output voltage or current value of the auxiliary generator by means of an adjustable impedance connected in series with the armature (or field winding if available) output end, or a linear or switching type driving element connected in series with the armature (or field winding if available) output end, with another end connected to a manual or electro-control signal input/output. Excitation of the auxiliary generator G101 against the series or shunt field winding of the main motor-generator in this embodiment may be a direct excitation or through a choking diode CR101 (or CR102) to prevent counter flow.

Figure 4:
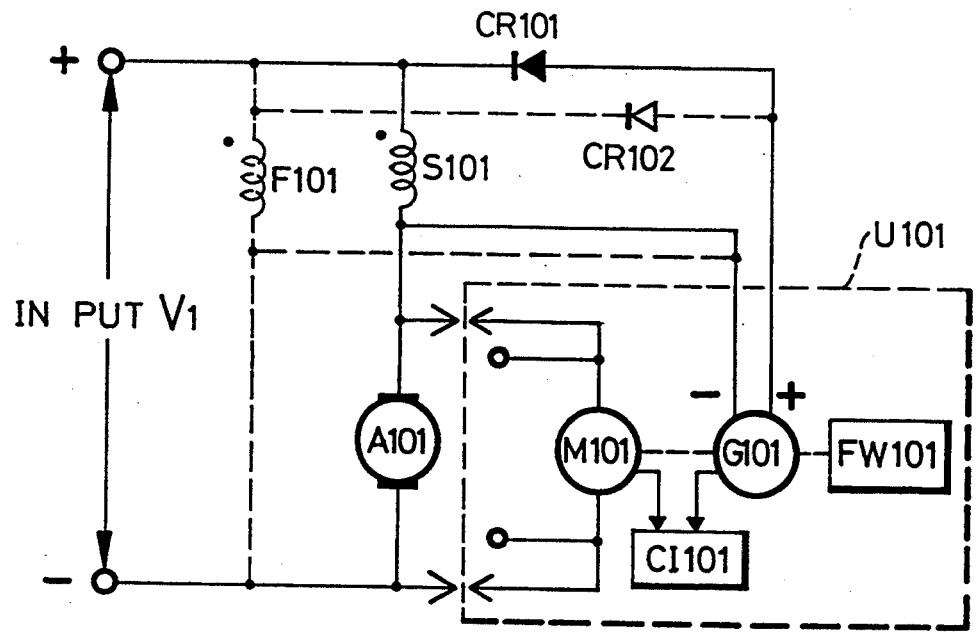
FIG. 4 is a schematic diagram showing an embodiment of the preferred dynamic current feedback magnetizing type shunt or series or compound DC motor-generator control circuit in which the current-follower motor of the feedback unit is connected in parallel with the armature of the main motor-generator.

FIG. 4 shows an embodiment of the preferred dynamic current feedback magnetizing type series or compound DC motor-generator control circuit in which the current-follower motor of the feedback unit is connected in parallel with the armature of the main motor-generator. In this embodiment, the main motor-generator set is a series motor which includes series field winding S101 and armature A101, or a compound motor further including shunt field winding F101, the series or shunt winding accepting feedback unit U101 control by virtue of choking diode CR101 (CR102). Follower motor M101 of feedback unit U101 is connected in parallel to the armature A101 of the main motor-generator such that the follower motor driving energy follows the end voltage of main motor-generator to the armature.

Auxiliary generator G101 is driven by follower motor M101 such that the generating capacity depends on the running speed to excite the series or shunt winding of the main motor via choking diode CR101 (or CR102). The relationship between the generating capacity and the running speed of the main motor-generator is either a direct ratio or inverse ratio subject to the wiring relationship between the follower motor and the main motor-generator, the generator including either a DC generator or an AC generator and rectifier, the output voltage or current of the auxiliary generator being controlled by means of control interface CI101 which, as in the other embodiments, includes an adjustable impedance connected in series with an output to the armature (or field winding if available) or a linear or switching type modulator connected in series with the output to the armature (or field winding if available), the other end of the control interface being connected to the manual or electro-control signal input/output, and the excitation by the auxiliary generator G101 of the series or shunt field winding of the main motor-generator being either direct via series connected choking diode CR101 (or CR102) to prevent counter flow.

Figure 5:
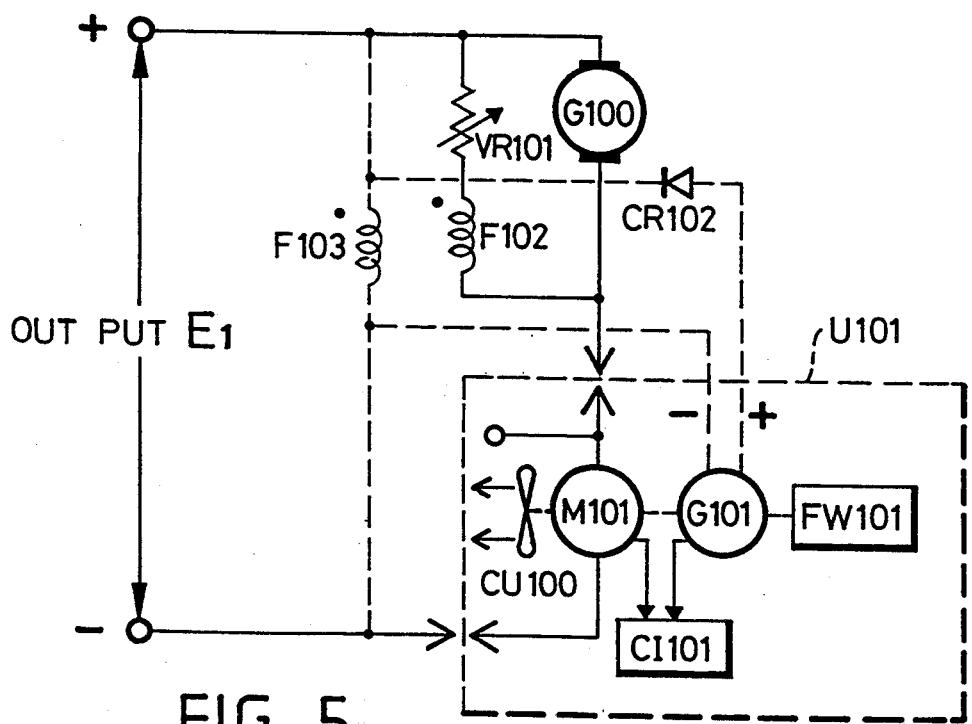
FIG. 5 is a schematic diagram showing an embodiment of the preferred dynamic current feedback magnetizing type shunt or series or compound DC motor-generator control circuit in which the main motor-generator includes a shunt type generator while the follower motor of the feedback unit is connected in series with an armature of the auxiliary generator.

FIG. 5 shows yet another embodiment of the preferred dynamic current feedback magnetizing type series or compound DC motor-generator control circuit, in which the follower motor of feedback unit is connected in series with an armature of the auxiliary generator, and in which the main motor-generator set includes self-excited field winding F102 or an excitation field winding F103 and generator armature G100, and the series or shunt winding accepts control by feedback unit U101 via choking diode CR102.

In this embodiment, follower motor M102 of feedback unit U101 also is connected in series with the armature, but if excessive current occurs on the armature of main generator, the follower motor can be parallel connected to the shunt winding F102 and then jointly connected in series with the armature of the main motor-generator.

Auxiliary generator G101 is driven by follower motor M101 to have a generating capacity which depends on the running speed for the purpose of exciting the field winding F103 of the main generator, the relationship between the generating capacity of generator G101 and the running speed of the main shunt generator being either a direct ratio or an inverse ratio subject to the wiring relationship between the follower motor and the main motor, generator being either a DC generator or an AC generator and rectifier.

Control interface CI101 controls an output voltage or current value of the auxiliary generator by means of an adjustable impedance connected in series with the armature (or field winding if available) output end, or by means of a linear or switching type modulator connected in series with the armature (or field winding if available) output end, the control interface also being connected to a manual or electro-control signal input/output. Excitation by the auxiliary generator G101 of the series or shunt field winding of the main motor-generator being either by direct excitation or by a positive series connection with a choking diode CR101 (or CR102) to prevent counter flow.

Those skilled in the art will appreciate that the auxiliary generator unit of the preferred embodiments, which provides feedback to the main motor-generator, may in practice include a mechanical flywheel FW101 mounted on the auxiliary generator unit or a capacitance connected in parallel with the output end of the auxiliary generator unit for regulating the response relationship to the main motor-generator. Moreover, the skilled artisan will appreciate that in the embodiments shown in FIGS. 2, 3 and 5, the electric energy of the follower motor increases in accordance with the armature current of the main motor-generator to increase the follower motor power and to increase its running speed or torsion. The follower motor may thus be used for driving a cool air pump CU100 of the main motor-generator with the result that the cooling effect varies depending on the current value of the main motor-generator armature, and such application can be combined with the original auxiliary motor-generator set or independently as a follower motor and cooling pump assembly.

Referring to the above-described applications, whether the main motor-generator is a motor or a generator, the following variations may be used: (1) the follower motor of feedback unit may be selected to accept feedback electric energy from the main motor-generator, including from the armature current, from the series winding end voltage, from the armature EMF, or from multiple feedback units driven by feedback electric energy from the aforesaid sources, or multiple feedback electric energy to drive an identical feedback unit to form various kinds of follower relationships with the main motor-generator; (2) the auxiliary generator set may take different forms including series, shunt and compound type generators, and have different current, voltage, and output characteristics; (3) the excitation current provided by the auxiliary generator to the original series or shunt winding of the main motor-generator set may either have the same polarity as the field current for assisted excitation or an opposite polarity for differential excitation; (4) the control interface may be used to control the current/voltage output polarity of the feedback unit. Because of the flexibility in selecting between the above-described conditions, the present dynamic current feedback magnetizing type series or compound DC motor-generator control circuit can have a greater variety of different characteristics than a conventional motor-generator, the chosen characteristics depending only on the engineering purpose for which the motor-generator is intended.

I claim:

1. A feedback-type motor-generator control circuit for a main motor-generator driven primarily by an external power source, said power source being supplied to an armature and excitation field winding of the main motor-generator, comprising:

at least one current-follower DC motor connected to the armature of the main motor-generator such that a speed of the current-follower motor depends on the amount of current passing through the armature of the main motor-generator, an auxiliary generator connected to and driven by the current-follower motor, the auxiliary generator being connected to the excitation field winding of the main motor-generator to provide an auxiliary excitation current thereto, and a control interface for controlling a voltage or impedance of the output from the auxiliary generator.

2. A control circuit as claimed in claim 1, wherein an output of said auxiliary generator has a polarity which is the same as a polarity of the field winding excitation current so that the combined field of the main motor-generator is strengthened when the main motor-generator armature current increases to provide positive feedback.

3. A control circuit as claimed in claim 1, wherein an output of the auxiliary generator has an opposite polarity from that of the field winding excitation current so that the combined field of the main motor-generator is reduced in response to an increase in the main motor-generator armature current to provide negative feedback.

4. A control circuit as claimed in claim 1, wherein said control interface includes means for switching the output of the auxiliary generator between (1) a state in which the field induced by the output of the auxiliary generator has the same polarity as the excitation field of the main motor-generator so that the combined field of the main motor-generator is strengthened when the main motor-generator armature current increases, and (2) a state in which the field induced the auxiliary generator output has a different polarity than the excitation field so that the combined field is reduced in response to an increase in the main motor-generator armature current.

5. A control circuit as claimed in claim 1, wherein the follower motor is connected in series with the main motor-generator armature and which thus uses the armature load current as the current for driving the follower motor.

6. A control circuit as claimed in claim 1, wherein the follower motor is connected in parallel with the armature of the main motor-generator, the voltage drop across the armature of the main motor-generator providing the electric energy for driving the follower motor.

7. A control circuit as claimed in claim 1, wherein the main motor-generator is a shunt type generator, having a shunt winding in addition to the main excitation winding to which the auxiliary generator is connected, the follower motor is connected in series with an armature of the shunt type generator, and also in parallel with a shunt winding of the shunt type generator to take up excess current.

8. A control circuit as claimed in claim 1, wherein the control interface includes an adjustable impedance connected in series between an output of the auxiliary generator and the field winding of the main motor-generator.

9. A control circuit as claimed in claim 1, wherein the control interface includes a linear or switching type modulator connected in series between an output of the auxiliary generator and the field winding of the main motor-generator.

10. A control circuit as claimed in claim 1, wherein a choking diode is connected in series between the output of the auxiliary generator and the main motor-generator field winding to prevent counterflow from the field winding to the auxiliary generator.

11. A control circuit as claimed in claim 1, further comprising means for regulating a response relationship between the main motor-generator and the auxiliary generator.

12. A control circuit as claim in claim 11, wherein the regulating means comprises a flywheel on the auxiliary generator.

13. A feedback-type motor-generator control circuit for a main motor-generator driven primarily by an external power source, said power source being supplied to an armature and series field winding of the main motor-generator, comprising:

at least one current-follower DC motor connected in parallel with the series winding such that a speed of the current-follower motor depends on the voltage drop across the main motor-generator series winding;

an auxiliary generator connected to and driven by the current-follower motor, the auxiliary generator being connected to the series field winding of the main motor-generator to provide an auxiliary excitation current thereto, and a control interface for controlling a voltage or impedance of the output from the auxiliary generator.

14. A control circuit as claimed in claim 13, wherein an output of said auxiliary generator has a polarity which is the same as a polarity of the series field winding excitation current so that the combined field of the main motor-generator is strengthened when the main motor-generator armature current increases to provide positive feedback.

15. A control circuit as claimed in claim 13, wherein an output of the auxiliary generator has an opposite polarity from that of the series field winding excitation current so that the combined field of the main motor-generator is reduced in response to an increase in the main motor-generator armature current to provide negative feedback.

16. A control circuit as claimed in claim 13, wherein said control interface includes means for switching the output of the auxiliary generator between (1) a state in which the field induced by the output of the auxiliary generator has the same polarity as the excitation field of the main motor-generator so that the combined field of the main motor-generator is strengthened when the main motor-generator armature current increases, and (2) a state in which the field induced the auxiliary generator output has a different polarity than the excitation field so that the combined field is reduced in response to an increase in the main motor-generator armature current.

17. A control circuit as claimed in claim 13, wherein the control interface includes an adjustable impedance connected in series between an output of the auxiliary generator and the field winding of the main-motor generator.

18. A control circuit as claimed in claim 13, wherein the control interface includes a linear or switching type modulator connected in series between an output of the auxiliary generator and the series field winding of the main motor-generator.

19. A control circuit as claimed in claim 13, wherein a choking diode is connected in series between the output of the auxiliary generator and the main motor-generator series field winding to prevent counterflow from the series field winding to the auxiliary generator.

20. A control circuit as claimed in claim 13, further comprising means for regulating a response relationship between the main motor-generator and the auxiliary generator.

21. A control circuit as claim in claim 20, wherein the regulating means comprises a flywheel on the auxiliary generator.

* * * * *